US005525142A

United States Patent [19]

Yamauchi et al.

[11] Patent Number: 5,525,142

[45] Date of Patent: Jun. 11, 1996

[54] ELECTRONIC MUSICAL INSTRUMENT CAPABLE OF CONTROLLING MUSICAL TONE CHARACTERISTICS ON A REAL-TIME BASIS

[75] Inventors: Akira Yamauchi; Fumiteru Takeda; Yasuyuki Umeyama; Kyoko Ono; Toru Kitayama; Tomoyuki Funaki, all of Hamamatsu, Japan

[73] Assignee: Yamaha Corporation, Japan

[21] Appl. No.: 279,333

[22] Filed: Jul. 22, 1994

[30] Foreign Application Priority Data

Oct. 28, 1993 [JP] Japan .................................... 5-292780

[51] Int. Cl.$^{6}$ .............................. G09B 15/04; G10H 7/00

[52] U.S. Cl. ............................................ 84/602; 84/477 R

[58] Field of Search ........................ 84/601–646, 477 R, 84/478

[56] References Cited

U.S. PATENT DOCUMENTS 4,432,265 2/1984 Oya et al. .

4,478,124 10/1984 Kikumoto ................................ 84/602

4,864,908 9/1989 Kino ...................................... 84/478 X 5,300,723 4/1994 Ito ........................................... 84/601

5,399,800 3/1995 Morita et al. ......................... 84/478 X

*Primary Examiner*—Stanley J. Witkowski

[57] ABSTRACT

An electronic musical instrument includes an ROM which stores tone color parameters for determining musical tone characteristics of musical tone signals. Operating elements are operated to create operation information for controlling the musical tone characteristics on real time basis. A tone generator circuit generates the musical tone signals, based on the cone color parameters read from the ROM and the operation information created by the operating elements. Scene memories and a RAM store the operation information created by the operating elements. The operation information is read from the scene memories or the RAM, in response to an instruction from the operator. The operation formation thus read is supplied to the tone generator circuit.

6 Claims, 11 Drawing Sheets

ELECTRONIC MUSICAL INSTRUMENT CAPABLE OF CONTROLLING MUSICAL TONE CHARACTERISTICS ON A REAL-TIME BASIS

BACKGROUND OF THE INVENTION

1. Field of the Invention

This invention relates to an electronic musical instrument which is provided with real-time operating elements for controlling musical tone characteristics on real time basis.

2. Prior Art

A conventional electronic musical instrument in general stores, for each tone color (e.g. voice), parameters for determining musical tone characteristics (hereinafter referred to as "tone color parameters"), such as volume, tone color, pitch, and various tonal effects, and determines basic musical tone characteristics, based on these stored tone color parameters, to thereby obtain musical tone signals having various tone colors. Besides such tone color parameters, various real-time operating elements such as a pitch bender wheel, volume pedal, an initial-touch element, and an after-touch element are employed to more delicately and finely control the volume, tone color, pitch, tonal effects, etc. of a musical tone signal, of which the basic musical tone characteristics have been determined as above, to thereby produce more delicate and expressive musical tones.

However, the conventional electronic musical instrument stores only the tone color parameters for determining basic musical tone characteristics, but is not adapted to store musical tones, of which musical tone characteristics such as the volume and tone color have been controlled by real-time operating elements. As a result, when it is desired to reproduce a musical tone signal, of which the basic musical tone characteristic has been determined, by finely controlling the signal by real-time operating elements, it is very difficult to again reproduce exactly the same musical tone signal as a musical tone signal having a musical tone characteristic thereof delicately and finely controlled by operation of the real-time operating elements, which was obtained before.

Particularly, in the case where the electronic musical instrument has a tone generator which is of the so-called physical model simulation type having delay means and filter means, a musical tone can be largely changed by operations of real-time operating elements, it is more difficult or even almost impossible to reproduce exactly the same musical tone signal as a musical tone signal once obtained by real-time operating elements. The difficulty increases as the number of real-time operating elements employed is larger. Furthermore, under the circumstances, even if the operator desires to change the musical tone characteristic of a musical tone to be generated, based on a desired musical tone signal which was once obtained by operating real-time operating elements, his desire cannot be easily satisfied.

SUMMARY OF THE INVENTION

It is an object of the invention to provide an electronic musical instrument which is capable of accurately reproducing musical tone signals which were once obtained by operations of real-time operating elements.

It is a further object of the invention to provide an electronic musical instrument which is capable of changing musical tone characteristics of musical tones to be generated, with ease, based on musical tones which were once obtained by operations of real-time operating elements.

Another object of the invention is to provide an electronic musical instrument which is capable of generating musical tone signals based on information on operations of real-time operating elements which can be controlled to vary in a manner unexpectable by the operator, to thereby enlarge that breath of performance.

A further object of the invention is to provide an electronic musical instrument which enables to recognize a real-time operating element which is being operated to generate operation information forming the musical tone characteristic of a musical tone being generated, as well as an amount of operation thereof, to thereby facilitate operation of the real-time operating elements and prevent erroneous operation of the real-time operating elements.

To attain the above first-mentioned object, the present invention provides an electronic musical instrument comprising parameter memory means storing parameters for determining musical tone characteristics of musical tone signals, first reading means for reading the parameters from the parameter memory means, operating means for creating operation information for controlling the musical tone characteristics on real time basis, musical tone signal-generating means for generating the musical tone signals, based on the parameters read by the first reading means and the operation information created by the operating means, operation information memory means for storing the operation information created by the operating means, second reading means responsive to an instruction from an operator, for reading the operation information from the operation information memory means, and supply means for supplying the operation information read by the second reading means to the musical tone signal-generating means.

Preferably, to attain the third mentioned object, the operation information memory means stores a plurality of sets of operation information, the electronic musical instrument including interpolation means for interpolating and outputting the plurality of sets of operation information.

Further, to attain the first and fourth mentioned object, the present invention provides an electronic musical instrument comprising operating means for creating operation information for controlling musical tone characteristics of musical tone signals on real time basis, operation information-generating means for generating operation information for controlling the musical tone characteristics of the musical tone signals, independently of the operating means, operation information memory means for storing the operation information created by the operating means, musical tone signal-generating means for generating the musical tone signals, based on the operation information stored in the operation information memory means, indication means for indicating whether the operation information created by the operating means is valid or invalid, control means for causing the indication means to indicate invalidity of the operation information created by the operating means if the operation information generated by the operation information-generating means does not coincide with the operation information created by the operating means when the operation information is generated by the operation information-generating means, and for causing the indication means to indicate validity of the operation information created by the operating means if the operation information stored in the operation information memory means does not coincide with the operation information created by the operating means when the operation information is created by the operating means, writing means for writing the operation information generated by the operation information-generating means into the operation information memory means upon generation thereof, and for writing the operation information created by the operating means into the operation information memory means if the indication means indicates validity thereof when the operation information is created by the operating means, and display means responsive to an indication from the indication means, for displaying whether the operation information created by the operating means is valid or invalid.

Preferably, to attain the second mentioned object, the electronic musical instrument includes a plurality of operating means constituting the operating means, first memory means storing a predetermined state of assignment of the plurality of operating means to a plurality of tone color parameters, and second memory means for storing a table for changing the predetermined state of assignment Also preferably, the electronic musical instrument includes second display means responsive to an output from the interpolation means, for displaying a state of operation of each of the plurality of operating means.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
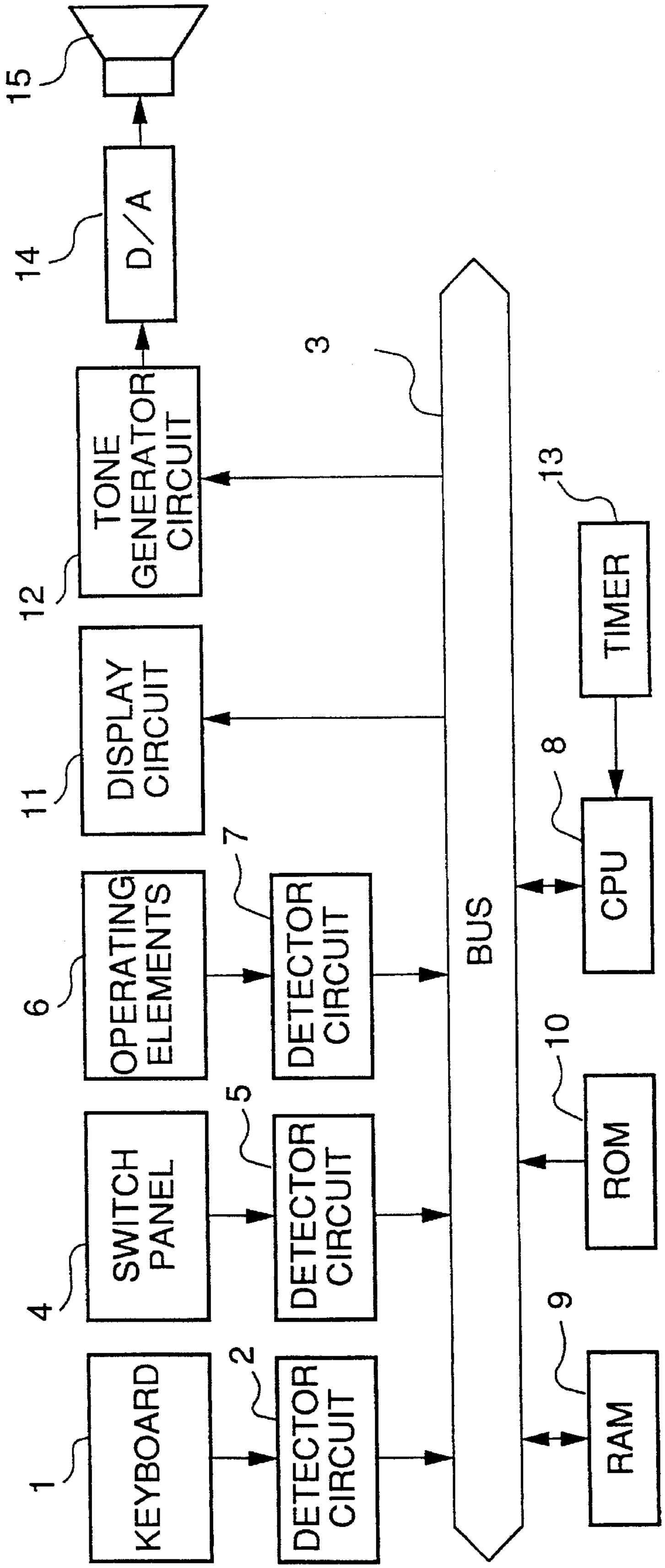
FIG. 1 is a schematic diagram showing the whole arrangement of an electronic musical instrument which is provided with real-time operating elements, according to an embodiment of the invention.

Referring first to FIG. 1, there is schematically illustrated the whole arrangement of an electronic musical instrument according to an embodiment of the invention. In the figure, reference numeral 1 designates a keyboard for designating tone pitches of musical tones to be generated, which is connected to a bus 3 via a detector circuit 2, which detects depressed states of keys of the keyboard 1 and generates key codes of depressed keys. Similarly, a switch panel 4 is connected to the bus 3 via a detector circuit 5, which detects depressed states of switches of the switch panel 4.

Figure 2:
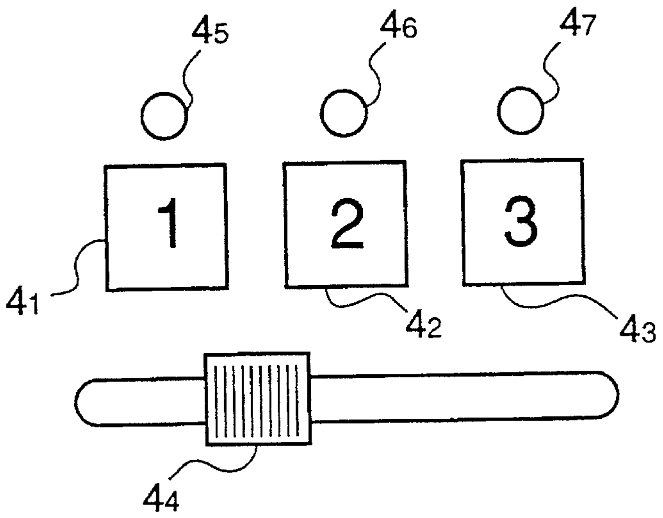
FIG. 2 is a schematic view showing the switch arrangement of a switch panel appearing in FIG. 1.

FIG. 2 shows, by way of example, the switch arrangement of the switch panel 4. The switch panel 4 is composed of three scene switches 41–43 for reading operation information data from memories (hereinafter merely referred to as "the scene memories"), not shown, for storing as position information states of operation of real-time operating elements (hereinafter merely referred to as "the operating elements"), hereinafter referred to, a scene slider 44 for determining an operation state value by means of interpolation based on tone color parameter values read by adjacent scene switches, and LED's 45–47 for displaying states of operation of the scene switches 41–43 and the scene slider 44 in the color of red, green or orange, for example.

The scene memories can have stored data thereof arbitrarily rewritten by the operator. In the present embodiment, three storage areas are provided for each tone color (voice), and each storage area can store states of operation of 13 kinds of operating elements, hereinafter specified, so that the total scene memories can store tone color parameter values determining three different tone color values per each tone color. As the scene memories, exclusive memories may be provided, or alternatively predetermined storage areas within a read-only memory (RAM) 9, hereinafter referred to, may be allotted for use as the scene memories.

The writing of states of operation of the operating elements into the scene memories is carried out in response to operation of each operating element by the operator such that when a desired musical tone characteristic is obtained by the operation of the operating element, a write switch, not shown, on the switch panel 4 is pushed to write an output value from the operating element then assumed into the corresponding scene memory. The scene memory into which the output value is to be written may be a scene memory corresponding to one of the scene switches 41–43 which is selected by the operator. Alternatively, the sequence in which the memories are to be selected may be previously set. Also alternatively, a write mode may be provided for selection by mode setting, and in which mode by pushing one of the scene switches 41–43, a state of operation of an operating element is written into a scene memory corresponding to the pushed scene switch.

If data on another tone color is selected while data on a desired tone color is being read from a scene memory for reproduction, one of the three scene memories which corresponds to the another tone color is selected for reading data therefrom and reproduction thereof. The scene memory which is to be selected for reading data therefrom may be previously determined per each tone color, or alternatively a particular scene memory may be always selected.

The operating elements are formed by 13 kinds of operating elements which are specified as follows: a pitch bender wheel, two modulation wheels, two continue sliders, two foot controllers, a modulation ball, a breath controller, an after-touch response device, an initial-touch response device, and an I & A touch response device.

Figure 3:
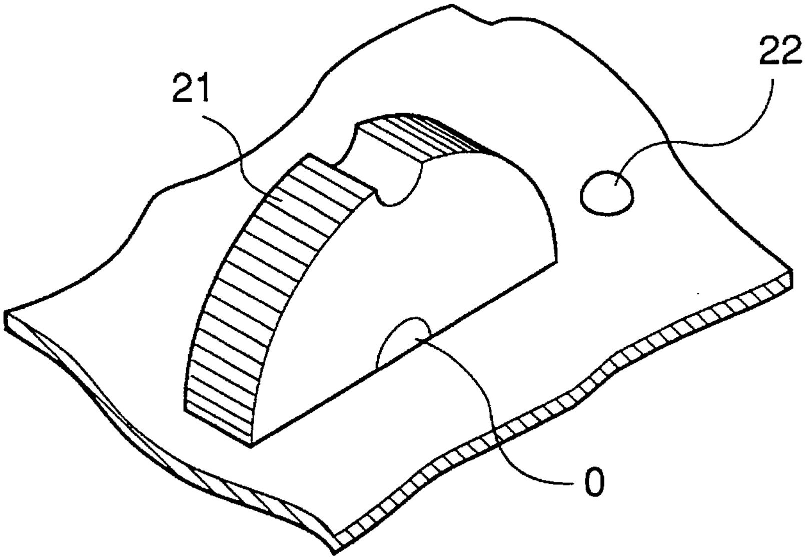
FIG. 3 is a fragmentary perspective view showing a pitch bender wheel employed in the electronic musical instrument.

The pitch bender wheel 21 has a configuration as shown in FIG. 3. The wheel is arranged for rotation about a central shaft O through a predetermined maximum angle to serve as an operating element for continuously controlling the pitch of a musical tone. Arranged in the vicinity of the pitch bender wheel 21 is an LED 22 for indicating the state of operation of the wheel 21 in red or in green. Similar LED's are provided for the other operating elements, which may be arranged in the vicinity of their respective operating elements or may be located within the switch panel 4.

The modulation wheels are operating elements for controlling the degree and speed of modulation of tone color parameters, mainly the pitch, volume, and tone color. The continue sliders, not shown, are slide volume switches, which are similar in construction to the scene slider 44. The foot controllers, not shown, are volume switches which can be operated by foot. The modulation ball, not shown, is an operating element which has a ball rotatable in any arbitrary direction to output a two-dimensional value, i.e. a value in the X direction and the Y direction. The breath controller, not shown, has a sensor which is adapted to be taken in the operator's mouth to detect the breath pressure, to thereby control the volume and tone color. It is mainly used to express a wind instrument sound. The after-touch response and initial-touch response devices, neither of which is shown, detect an after-touch output value and an initial-touch output value from the keyboard 1, respectively. The I & A touch response device, not shown, outputs a value changing from an initial-touch output value from an after-touch output value by interpolation.

The objects to be controlled by these operating elements are selected to such tone color parameters as can be easily controlled by respective operating elements. The assignment of operating elements to objects to be controlled thereby may be freely changed. Further, the operating elements applicable to the invention are not limited to the above thirteen operating elements but other kinds of operating elements may be employed.

Referring again to FIG. 1, the operating elements 6 are connected to the bus via a detector circuit 7 which detects states of operation of the operating elements. Further connected to the bus 3 are a central processing unit (CPU) 8, the RAM 9, a ROM 10, a display circuit 11, and a tone generator circuit 12 such that these elements as well as the detector circuits 2, 5 and 7 are connected to each other via the bus 3.

The CPU 8 controls the operation of the whole musical instrument. Connected to the CPU 8 is a timer 13 for measuring a time period elapsed before generation of a timer interrupt request. The CPU 8 is responsive to the timer interrupt request from the timer 13, to interrupt a processing then being carried out and execute a timer interrupt processing.

The RAM 9 temporarily stores results of computations and various kinds of information. In the present embodiment, the RAM 9 further stores an assignment change table in a storage area thereof. The assignment change table is provided to change a state of assignment of operating elements to objects or tone color parameters to be controlled thereby. The ROM 10 stores control programs to be executed by the CPU 8, values of tone color parameters, a state of assignment of operating elements to objects or tone color parameters which is previously set, etc. The display circuit 11 is formed of LCD's and LED's and displays various kinds of input information, e.g. the state of assignment of operating elements to objects or tone color parameters, and states of operation of the scene switches 41–43 and the scene slider 44.

The tone generator circuit 12 generates a digital musical tone signal according to performance data output from the CPU 8 via the bus 3, which signal is supplied to a D/A converter 14 to be converted thereby to an analog signal. The analog signal from the D/A converter 14 is supplied to a sound system 15 formed of loudspeakers or the like to be converted to musical tones.

Figure 4:
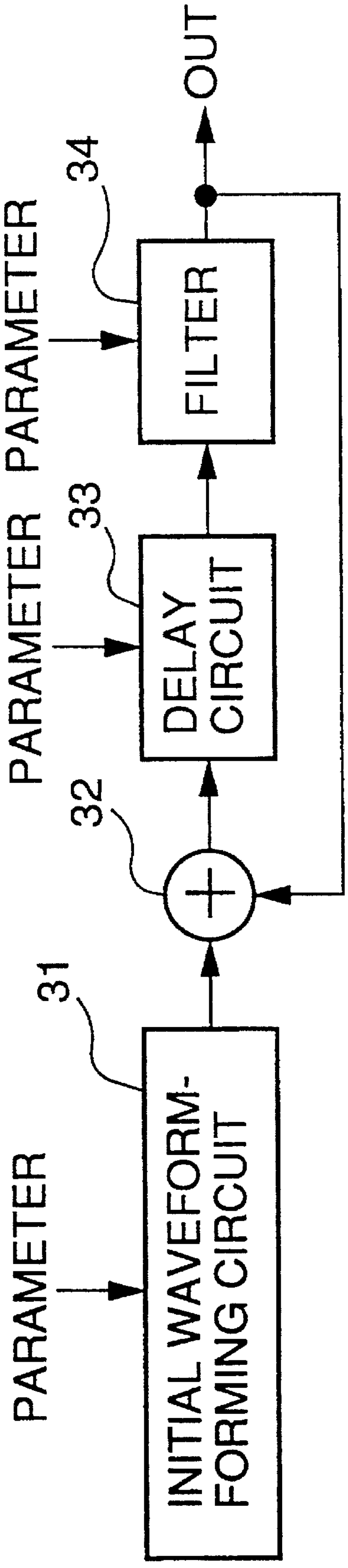
FIG. 4 is a block diagram showing the interior construction of a tone generator circuit appearing in FIG. 1.

FIG. 4 shows an example of the construction of the tone generator circuit 12 which is of the physical model simulation type. In the figure, an initial waveform-forming circuit 31 supplies its output to an input terminal of an adder 32 which supplies its output to a delay circuit 33 which controls an amount of delay in response to a parameter input thereto. An output from the delay circuit 33 is delivered to a filter 34 which controls a characteristic (filter coefficient) in response to a parameter input thereto. An output from the filter 34 is delivered as a musical tone signal to the D/A converter 14, while the musical tone signal is fed back to the other input terminal of the adder 32 where it is added to the initial waveform from the initial waveform-forming circuit 31. The initial waveform-forming circuit 31 is also supplied with values of parameters for determining the initial waveform in response to information from the keyboard 1, the switch panel 4, and the operating elements 6. The initial waveform thus determined and output from the initial waveform-forming circuit 31 is subjected to repeated delaying and characteristic-changing by the delay circuit 33 and the filter 34 to be generated as a musical tone signal.

The control operation carried out by the CPU 8 will now be described with reference to FIG. 5 to FIG. 10.

Figure 5:
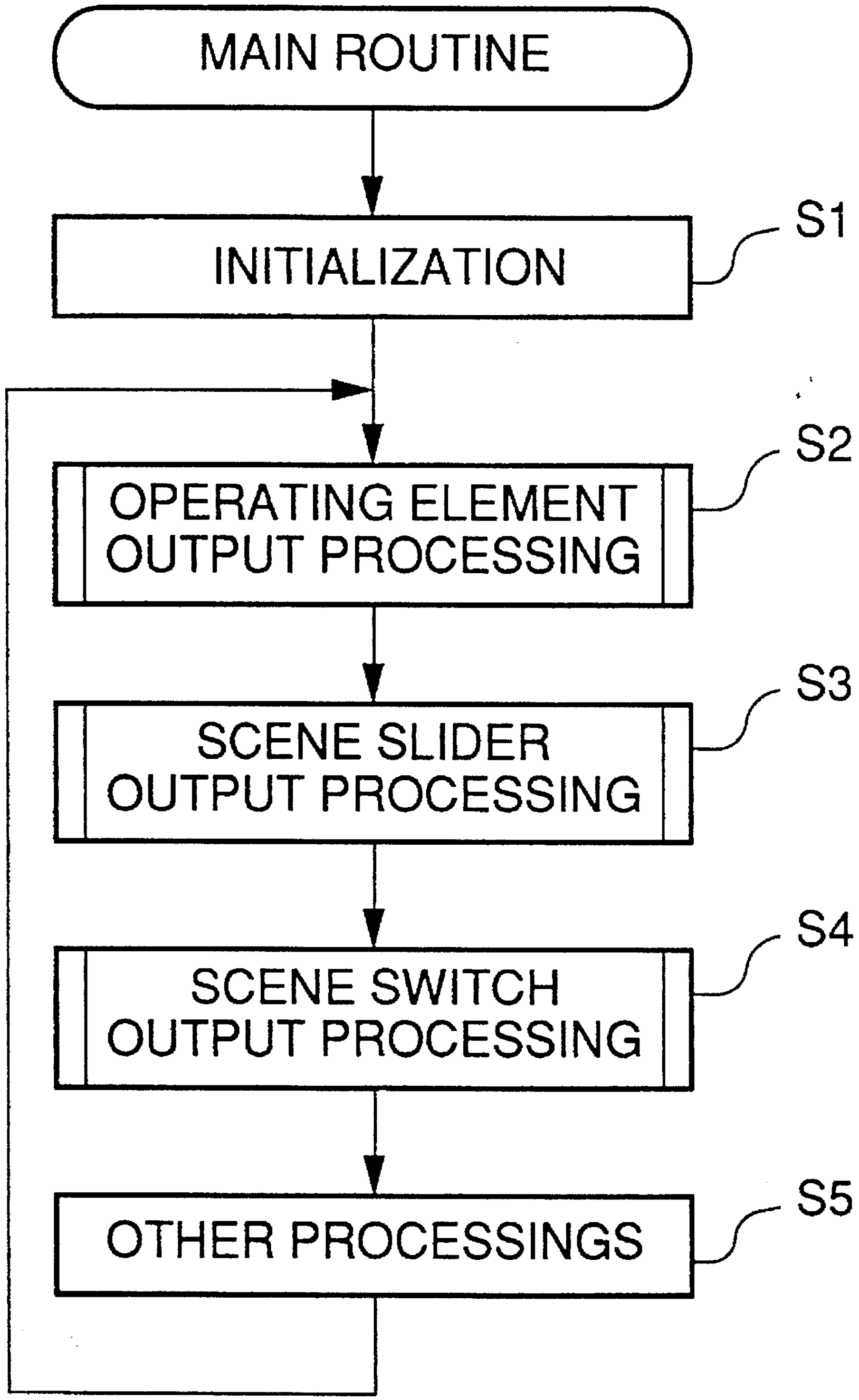
FIG. 5 is a flowchart showing a main routine executed by a CPU appearing in FIG. 1.

FIG. 5 shows a main routine executed by the CPU 8. First, at a step S1, initialization of the CPU 8, the RAM 9, etc. is carried out. Then, at a step S2, a subroutine for processing outputs from various operating elements is executed, wherein states of operation of the operating elements 6 are detected, and parameter values based on the detected operation states are supplied to the tone generator circuit 12. At a step S3, a subroutine for processing an output from the scene slider 44 is executed, wherein tone color parameter values read from adjacent scene memories are subjected to interpolation based on an output from the scene slider 44. Then, at a step S4, a subroutine for processing outputs from the scene switches 41–43 is executed, wherein when any of the scene switches 41–43 is depressed, a value of a tone color parameter corresponding to the depressed switch is selectively read from the corresponding scene memory and output. Finally, at a step S5, other processings are carried out in response to depressed states of the keys of the keyboard 1, switches of the switch panel 4, etc., followed by the program returning to the step S2 to repeatedly execute the steps S2–S5.

Figure 6:
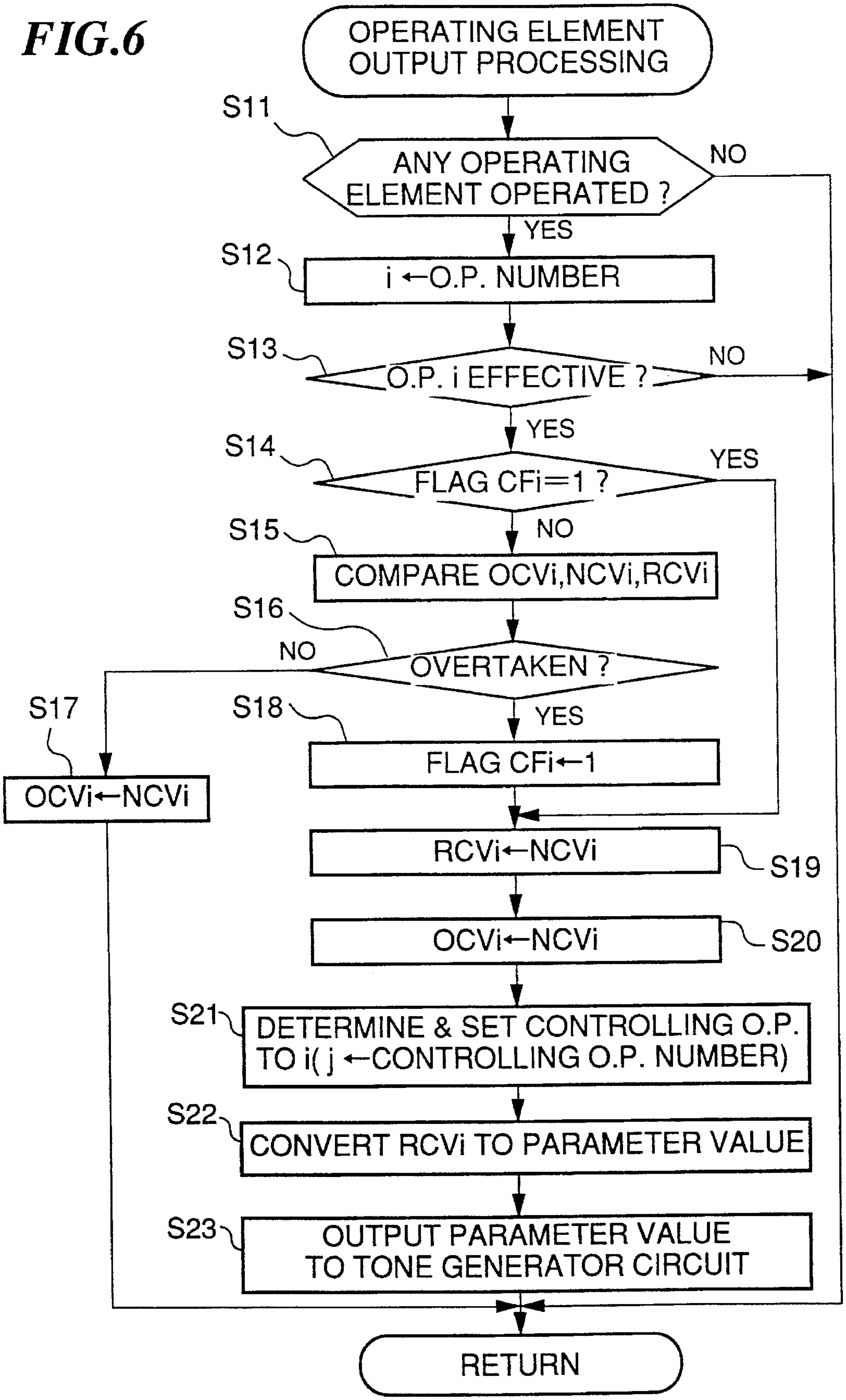
FIG. 6 is a flowchart showing details of a subroutine for processing outputs from various operating elements, which is executed at a step S2 in FIG. 5.

FIG. 6 shows details of the subroutine for processing outputs from the operating elements, which is executed at the step S2 in FIG. 5.

First, at a step S11, it is determined whether or not any of the operating elements has been operated. If none of the operating elements has been operated, the present subroutine is immediately terminated, whereas if any operating element has been operated, a number allotted to the operated operating element (hereinafter referred to as "operating element number") is stored into a storage area i within the RAM 9 at a step S12. For example, as the operating element number, "0" is allotted to the pitch bender wheel, "1" to one of the modulation wheels, and so forth (refer to an assignment change table in FIG. 11). An operating element corresponding to the operating element number will be referred to as "the operating element i", hereinafter.

Then, at a step S13, it is determined whether or not the operating element i is an effective element, that is, whether or not any tone color parameter is assigned to the operating element i. If no tone color parameter is assigned to the operating element i, i.e. the operating element i is not an effective element, the present subroutine is immediately terminated, whereas if a tone color parameter is assigned to the operating element i, the program proceeds to a step S14. The determination as to the effectiveness of the operating element i is carried out based on the assignment table stored in the ROM 10 and the assignment change table stored in the RAM 9.

At the step S14, a value of a flag CFi indicating whether or not data based on the state of operation or position value of the operating element i is being output is determined. If the value of the CFi is "0", it indicates that data based on the state of operation of the operating element i is not being output, that is, data based on a state of operation of the operating element read from the scene memory or based on the position of the scene slider is being output, whereas if the CFi value is "1", it indicates that data based on the state of operation of the operating element i is output. In the present embodiment, when data based on a state of operation of an operating element read from a scene memory or based on the position of the scene slider is being output, the value of this state of operation is set for the tone generator circuit 12, instead of the actual state of operation of the operating element. If the operation state-based data value read from the scene memory or based on the scene slider position is suddenly changed to the actual operation state-based data value, an unnatural sound will be generated. To prevent this, it is so arranged that the actual operation state-based data value is not output until it reaches or exceeds the operation state-based data value read from the scene memory or based on the scene slider position.

When it is determined at the step S14 that the value of the flag CFi is "0", the program proceeds to a step S15, wherein a comparison is made between an immediately preceding value of the state of operation of the operating element i stored in a storage area OCVi within the RAM 9 (hereinafter referred to as "the OCVi value"), a present value of the state of operation of the operating element i stored in a storage area NCVi within the RAM 9 (hereinafter referred to as "the NCVi value"), and a value of the state of operation of the operating element i now being generated and delivered to the tone generator circuit 12, which is stored in a storage area RCVi within the RAM 9 (hereinafter referred to as "the RCVi value"), to thereby determine whether or not the actual operating position of the operating element i has reached or exceeded an operating position of the operating element i stored in the scene memory, i.e. the former has overtaken the latter. If the former has not yet overtaken the latter, the program proceeds to a step S17, wherein the OCVi value is updated by replacing the same value with the NCVi value, followed by terminating the subroutine, whereas if the former has overtaken the latter, the program proceeds to a step S18, wherein the value of the flag CFi is set to "1", followed by the program proceeding to a step S19.

At the step S19, the RCVi value is updated by replacing the same value with the NCVi value, and then at a step S20 the OCVi value is updated by the NCVi value, similarly to the step S17. Then, at a step S21 a controlling operating element number which corresponds to the operating element i is determined by referring to the assignment change table, and the determined controlling operating element number is stored into a storage area i within the RAM 9. Hereinafter, the operating element corresponding to the number stored into the storage area i will be referred to as "the operating element i".

Figure 11:
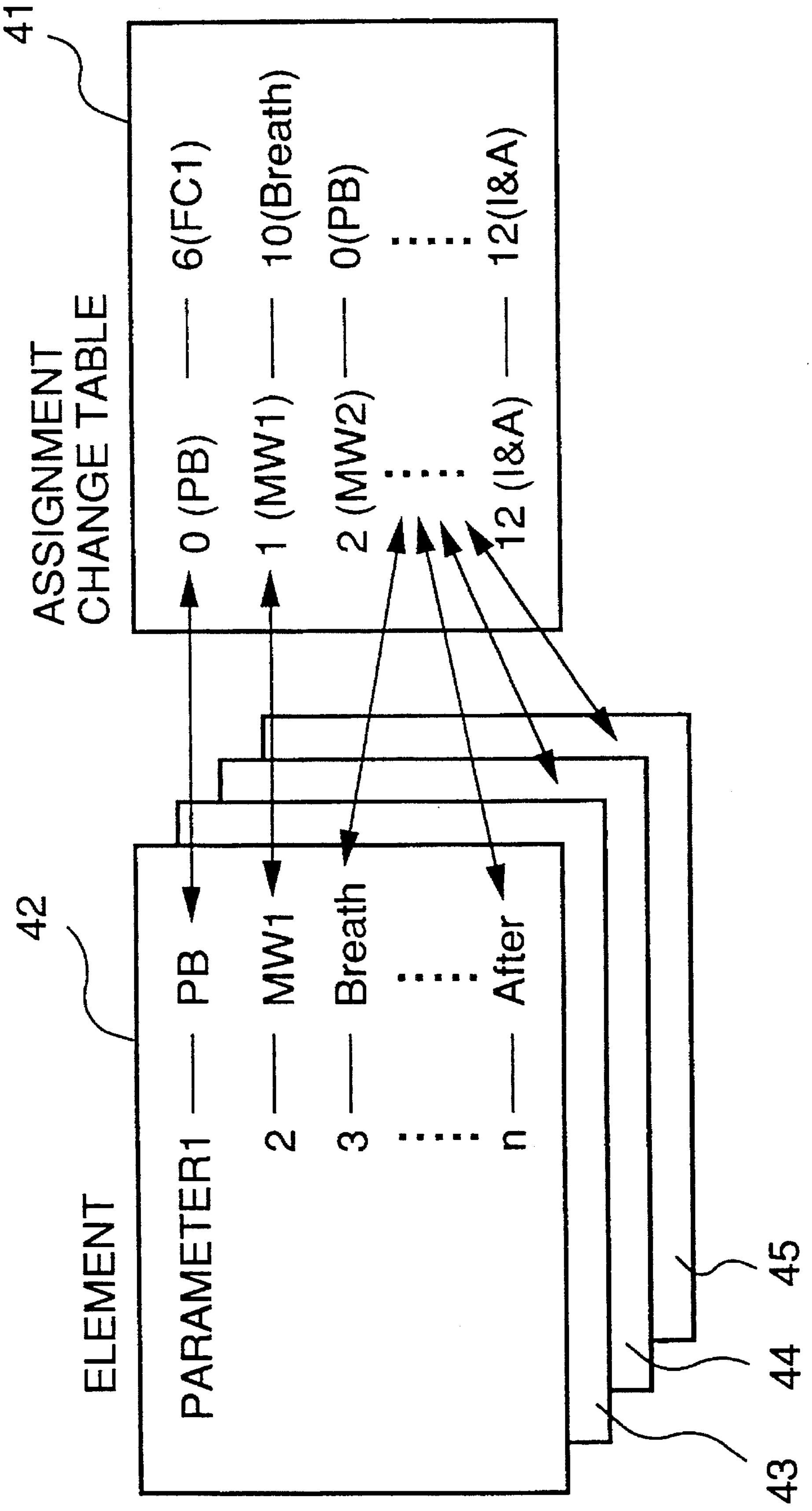
FIG. 11 is a schematic view useful in explaining a manner of determining operating elements to be controlled, which is executed at a step S21 in FIG. 6.

FIG. 11 shows a manner of determining the controlling operating element, i.e. an operating element to be controlled, at the step S21.

As previously stated, in the present embodiment, the correlation between tone color parameters and operating elements for controlling them, which has been previously set, can be changed. In FIG. 11, the assignment change table 41, which is stored in the RAM 9, has table data for changing the previously set correlation to a newly set one. The tone generator circuit 12 of the present embodiment has four elements 42–45 which are operated at the same time to generate a musical tone signal having a desired tone color. Each of the elements 42–45 forms a minimum unit for creating a musical tone signal and corresponds to the circuit of FIG. 4, previously described. Each element is supplied with a plurality of tone color parameters. As shown in the figure, an operating element is previously assigned to each tone color parameter of each element. The relationship based on the assignment is stored in the assignment table within the ROM 10. The correlation between tone color parameters and operating elements within each element need not be a one-to-one correlation, but it may be set such that one operating element is used to control a plurality of tone color parameters.

Referring again to FIG. 6, at a step S22, the RCVi value updated at the step S19 is converted to a parameter value, and then at a step S23 the parameter value converted at the step S22, controlled by the operating element i, is delivered to the tone generator circuit 12, followed by terminating the program.

Figure 12:
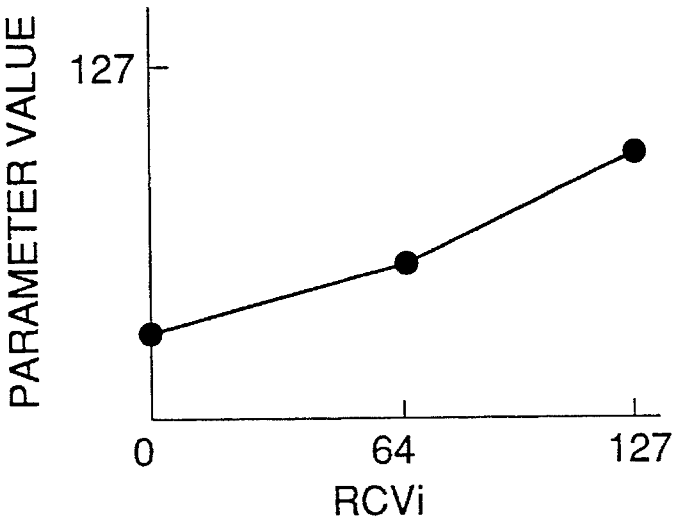
FIG. 12 shows a conversion table for converting an RCVi value to a parameter value.

FIG. 12 shows a conversion table for converting the RCVi value to a parameter value, which is stored in the ROM 10. As shown in the figure, parameter values to be selected when the RCVi value assumes "0", "64", and "127", respectively, are stored. Further, parameter values to be selected when the RCVi value falls between "0" and "64", and between "64" and "127" are calculated by linear interpolation beforehand and stored. The reason why such a conversion table is used is that while the RCVi value can assume values from "0" to a maximum value, for instance, "127" if the value is expressed in 7 bits, the tone color parameter cannot necessarily assume values from "0" to "127".

Figure 7:
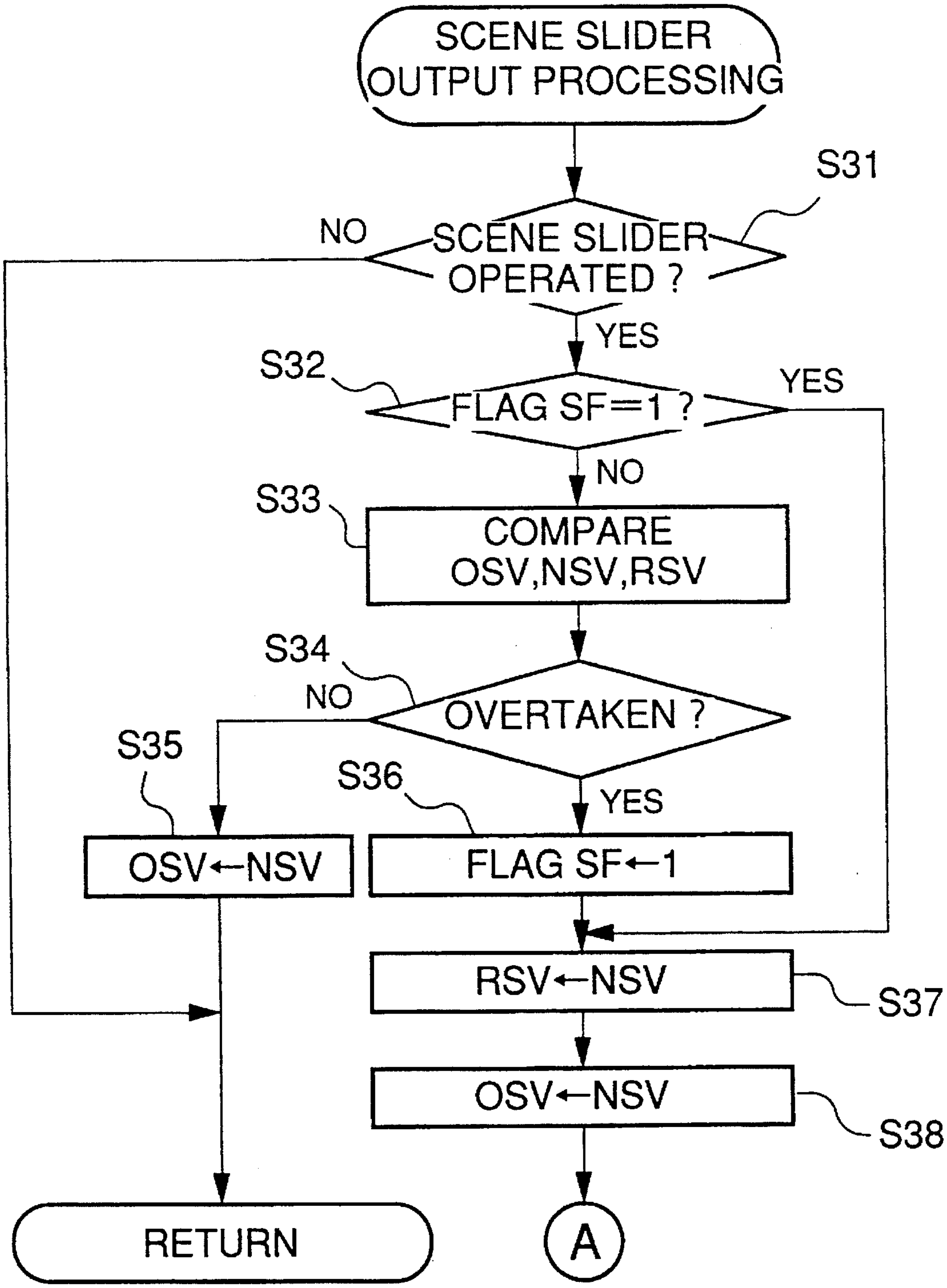
FIG. 7 is a flowchart showing details of a subroutine for processing an output from a scene slider, which is executed at a step S3 in FIG. 5.
Figure 8:
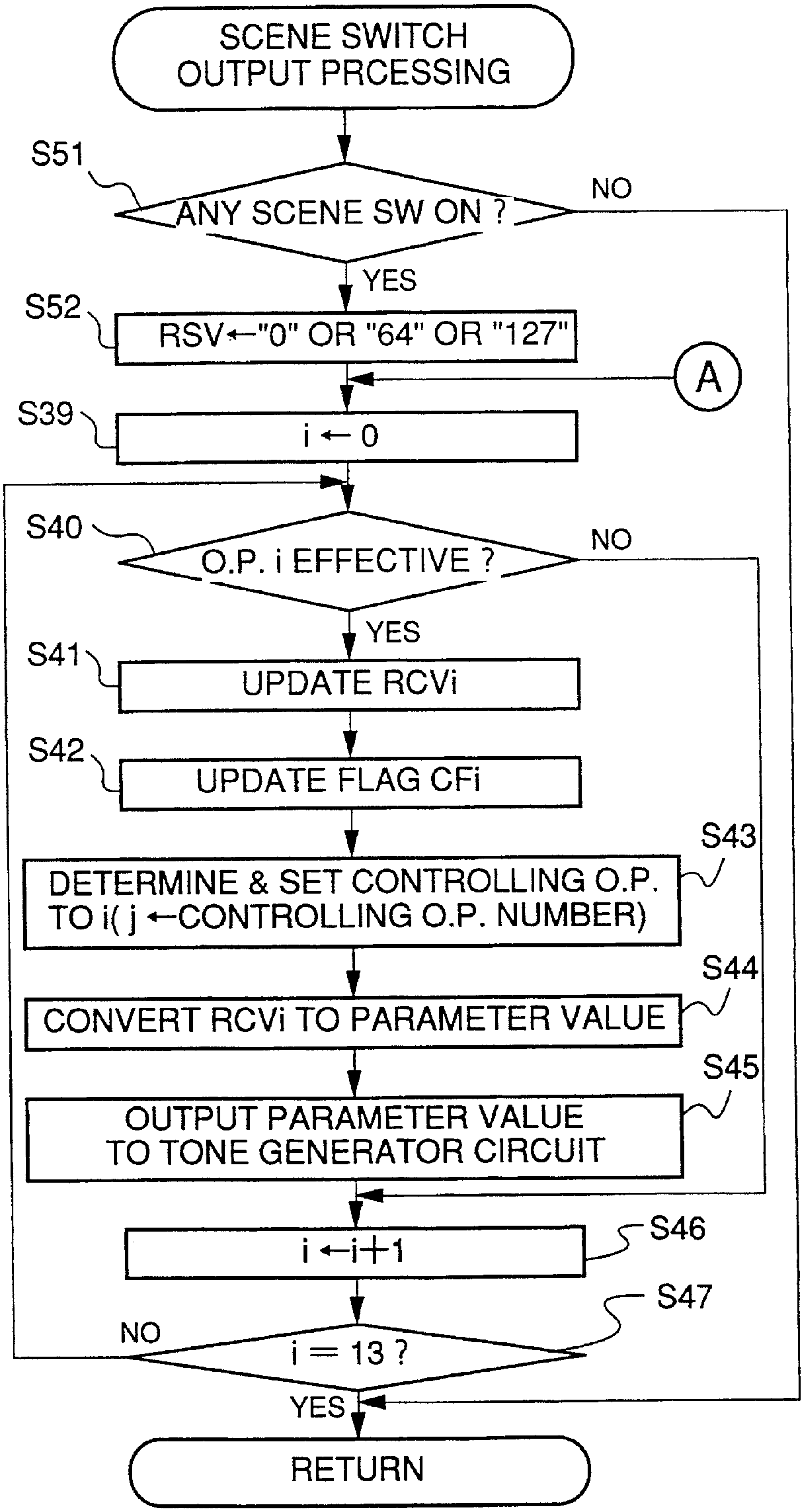
FIG. 8 is a flowchart showing details of a subroutine for processing outputs from scene switches, which is executed at a step S4 in FIG. 5.

FIG. 7 shows details of the subroutine for processing an output from the scene slider 44, which is executed at the step S3 in FIG. 5. First, at a step S31, it is determined whether or not the scene slider 44 has been operated. If it has not be operated, the present subroutine is immediately terminated, whereas if it has been operated, the program proceeds to a step S32, wherein the value of a flag SF indicating whether or not data based on a state of operation or position value of the scene slider 44 is being output is determined. The flag SF has a similar function to that of the flag CFi previously referred to. If the value of the flag SF is "0", the program proceeds to a step S33, wherein values OSV, NSV, and RSV corresponding, respectively, to the values OCVi, NCVi, and RCVi, and indicative of the state of operation of the scene slider 44 are compared with each to thereby determine whether or not the operating position of the scene slider has reached or exceeded an operating position of the same stored in the RAM 9, i.e. the former has overtaken the latter, similarly to the step S16. The values OSV, NSV and RSV are stored, respectively, in storage areas OSV, NSV and RSV within the RAM 9. If the former has not overtaken the latter, the program proceeds to a step S35, wherein the OSV value is updated by replacing the same value with the NSV value, followed by terminating the subroutine, whereas if the former has overtaken the latter, the program proceeds to a step S36, wherein the value of the flag SF is set to "1", followed by updating the RSV value by replacing the same value with the NSV value at a step S37, and then updating the OSV value by replacing the same value with the NSV value at a step S38. After the updating of the RSV, OSV values, the program proceeds to a subroutine shown in FIG. 8 showing details of the subroutine for processing outputs from scene switches, which is executed at the step S4 in FIG. 5. At a step S39 in FIG. 8, the storage area i is cleared, and then steps S40–S45 are repeatedly executed while the i value is incremented by a value of 1 whenever the loop including the steps S40–S45 is executed, until the i value becomes "13" at a step S47. That is, with regard to all the operating elements i, the steps S40–S45 are executed.

At the step S40, similarly to the step S13, it is determined whether or not the operating element i is an effective one. If it is not an effective one, the program skips over the steps S41–S45 to the step S46 to increment the i value. On the other hand, if the operating element i is effective, the program proceeds to the step S41, wherein the RCVi value is updated by linearly interpolating RCVi values of the operating element i stored in scene memories corresponding to two of the scene switches 41–43 corresponding in position to the position (value RSV) of the scene slider 44.

Figure 13:
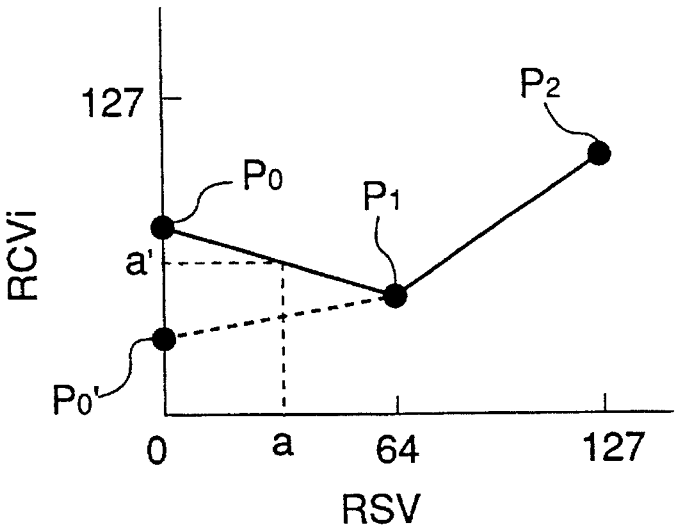
FIG. 13 is a view useful in explaining a manner of determining the RCVi value from an RSV value.

FIG. 13 shows a manner of determining the RCVi value from the RSV value. As shown in the figure, when the RSV value assumes "0", "64", and "127", respectively, the RCVi value is equal to output values from the operating element i assumed at the time they were stored into the respective scene memories. For example, assuming now that the RSV value assumes a value a falling between "0" and "64", an interpolation is carried out by the use of a straight line (solid line) passing two points P0 and P1 to determine a value a' to thereby determine or update the RCVi value. Similarly, when the RSV value falls between "64" and "127", a linear interpolation is carried out by the use of a straight line (solid line) passing two points P1 and P2 to determine or update the RCVi value. The table of FIG. 13 is provided for each operating element i as well as for each tone color and stored in the RAM 9. Further, when a state of operation of an operating element i stored in a scene memory is changed, an RCVi value corresponding to the operating element and the scene memory is changed as shown, e.g. by a point P0', and accordingly the table is updated by data obtained by a linear interpolation carried out based on a straight line (broken line) passing the points P0' and P1.

Referring again to FIG. 8, if the RCVi value determined by interpolation at the step S41 is equal to a value assumed before the updating, the flag CFi is set to "1" at a step S42, whereas if the former differs from the latter, the flag CFi is reset to "0" at the step S42. Subsequently, the steps S43–S45 are executed, processings of which are similar to those of the steps S21–S23, described previously, and therefore description thereof is omitted.

Although in the present embodiment, values of a tone color parameter stored in two scene memories corresponding to two adjacent scene switches are subjected to interpolation, based on the position of the scene slider 44, alternatively values of a tone color parameter stored in three or more scene memories may be subjected to interpolation. For example, there may be provided a scene slider formed by a joy stick or the like and four scene memories may be provided for storing values of a tone color parameter falling, respectively, in positive and negative sides with respect to the X direction and positive and negative sides with respect to the Y direction, and interpolation is carried out, based on the four values stored in the scene memories and the position of the scene slider in the X and Y directions.

Details of the subroutine for processing outputs from the scene switches executed at the step S4 in FIG. 5 will be further described with reference to FIG. 8. At a step S51, it is determined whether or not any of the scene switches 41–43 has been depressed. If none of the scene switches has been depressed, the present subroutine is immediately terminated, whereas if any of the scene switches has been depressed, a value corresponding to the depressed switch ("0", "64" or "127") is stored into the storage area RSV within the RAM 9. Then, the program proceeds to the step S38 to execute the steps S38–S46, described previously.

Figure 9:
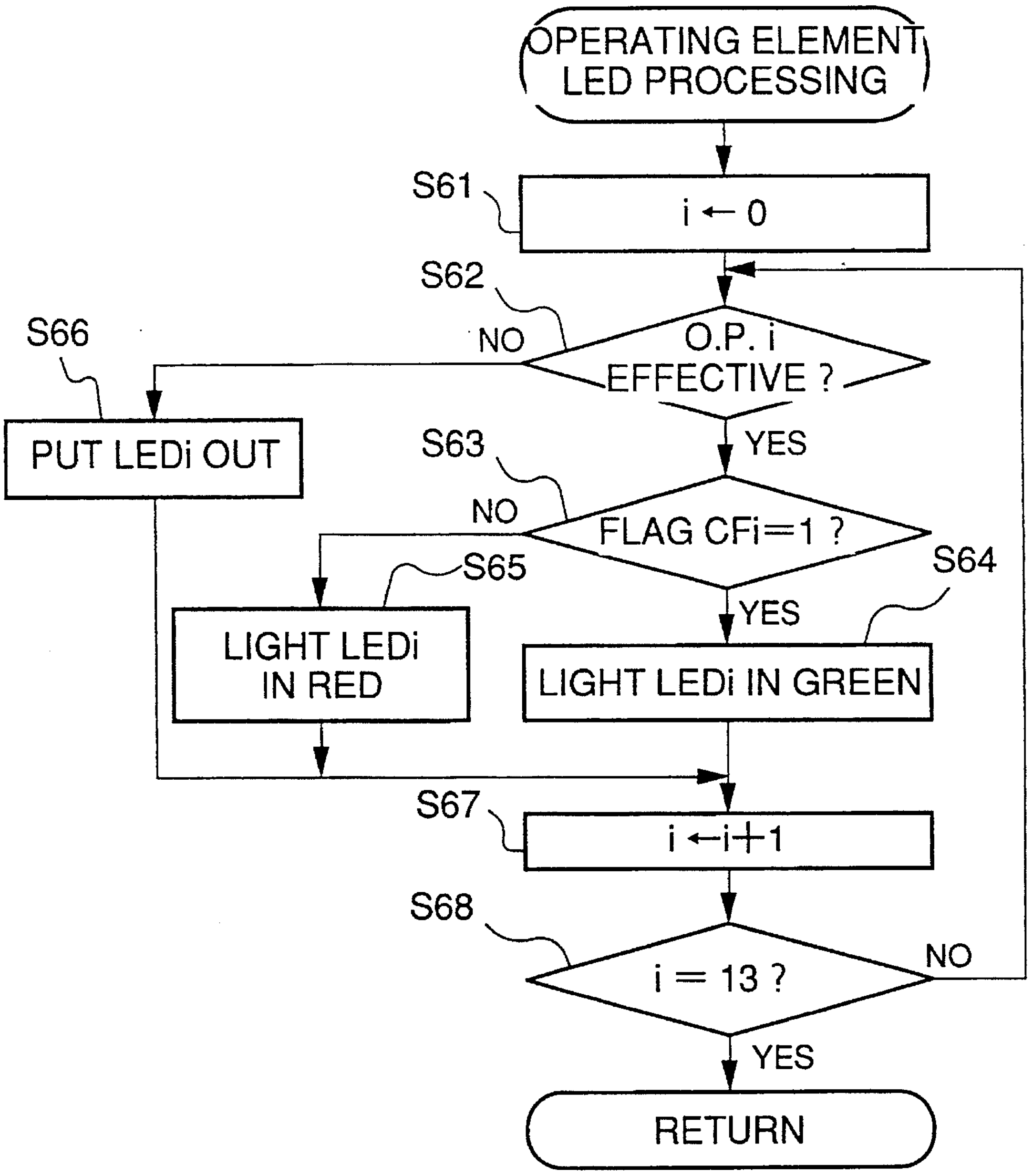
FIG. 9 is a flowchart showing details of a subroutine for controlling LED's indicating operative states of operating elements.
Figure 10:
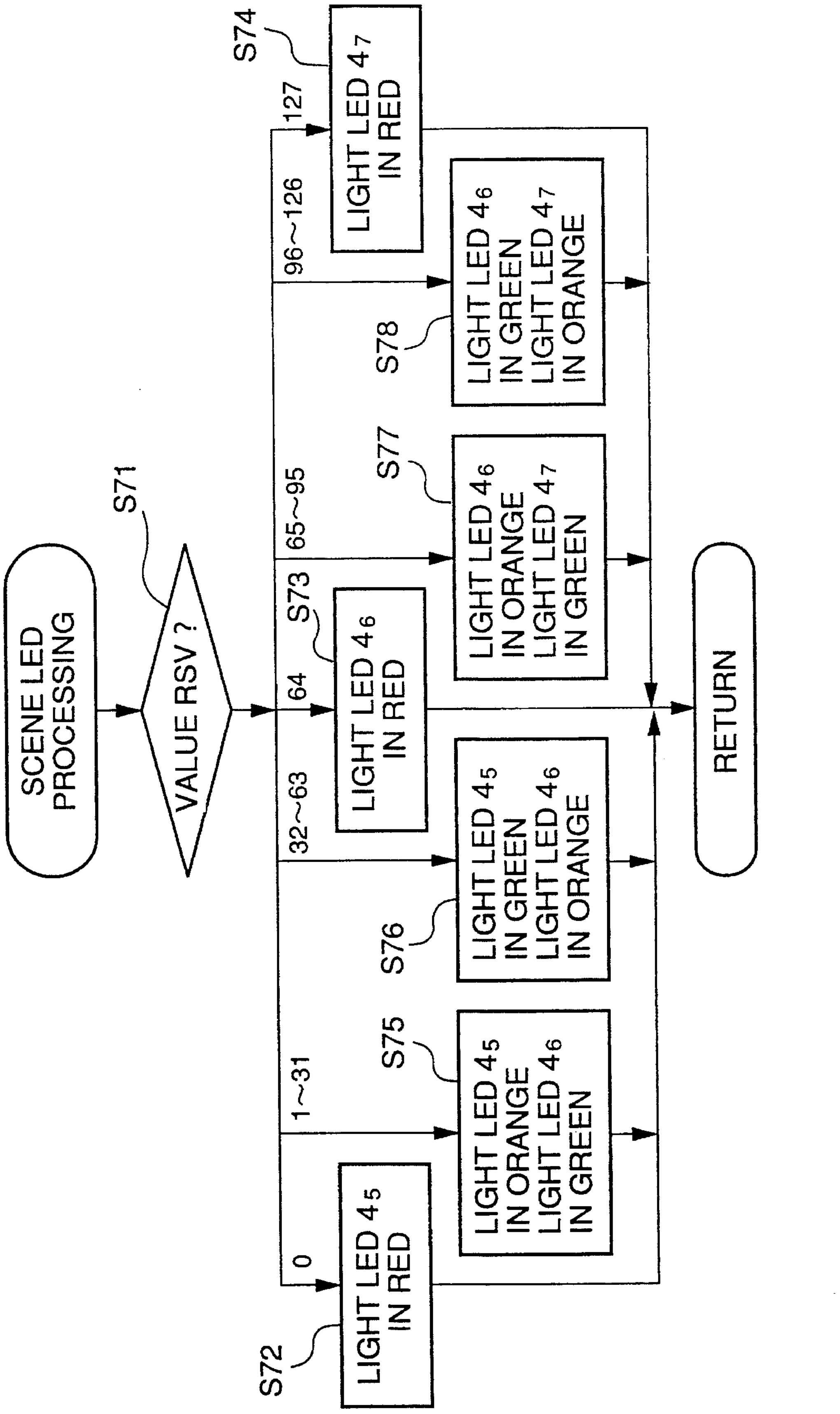
FIG. 10 is a flowchart showing details of a subroutine for controlling LED's indicating operative states of the scene switches.

FIG. 9 shows details of a subroutine for controlling LED's indicating operative states of operating elements, including the LED 22 appearing in FIG. 3. FIG. 10 shows details of a subroutine for controlling LED's 45–47 in FIG. 2 indicating operative states of the scene switches. These subroutines are executed by the timer interrupt processing.

First, referring to FIG. 9, the storage area i is cleared at a step S61, followed by determining whether or not the operating element i is effective, at a step S62. If the operating element i is effective, the value of the flag CFi is determined at a step S63. If the CFi value is "1", a corresponding LED (hereinafter referred to as "the LEDi") is lighted in green at a step S64, whereas if the CFi value is "0", the LEDi is lighted in red at a step S65. When the LEDi is lighted in green, it means that the operating element i is effective, and at the same time data based on the state of operation of the operating element i is being delivered to the tone generator circuit 12, while when the LEDi is lighted in red, it means that the operating element i is effective, but data based on its operation state is not being delivered to the tone generator circuit 12. On the other hand, it is determined at the step S62 that the operating element i is not effective, the LEDi is put out, at a step S66.

Then, the i value is incremented by 1 at a step S67, followed by determining at a step S68 whether or not the above described LEDi control processing has been completed for all the operating elements i. If the answer is negative (NO), the program returns to the step S62 to repeat the LED control processing, whereas if the answer is affirmative (YES), the present subroutine is terminated.

Referring next to FIG. 10, first, the RSV value is determined at a step S71. If the RSV value is "0", "64", or "127", it means that the scene slider 44 is in a position just corresponding to the position of any scene switch 41–43, that is, either the operating element i is in a position to permit outputting of an output from any corresponding scene memory without the need of interpolation, or the scene slider 44 has not been operated after any scene switch 41–43 was operated. In such a case, the corresponding LED 45–47 is lighted in red (step S72, S73, or S74).

On the other hand, if the scene slider 44 has been operated such that it is brought into a position intermediate between the positions of the scene switches 41, 42, the LED's 45, 46 are lighted in colors depending upon whether the scene slider 44 is closer to the scene switch 41 or to the scene switch 42 with respect to the middle point between the scene switches 41, 42. More specifically, if the RSV value assumes one of values 1–31, the LED 45 is lighted in orange and the LED 46 in green at a step S75, whereas if the RSV value assumes one of values 32–63, the LED 45 is lighted in green and the LED 46 in orange at a step S76.

On the other hand, when the scene slider 44 has been operated to a position intermediate between the scene switches 42, 43, if the RSV value assumes one of values 65–95, the LED 46 is lighted in orange and the LED 47 in green at a step S77, whereas if the RSV value assumes one of values 96–126, the LED 46 is lighted in green and the LED 47 in orange at a step S78.

Since the LED's 45–47 are controlled in the above described manner, it can be visually ascertained which value of interpolated data is being delivered to the tone generator circuit 12, depending upon the position of the scene slider 44. Moreover, even if the set value becomes different from the position of the scene slider 44 due to operation of any scene switch 41–43, the present position of the scene slider 44 can be recognized, thereby facilitating the operation of the switches as well as preventing erroneous operation.

Although in the above described embodiment it is indicated by means of the color of lighting of an LED or LED's whether or not the actual state of operation of the operating element is different from a state of operation set by the scene switch 41–43 or the scene slider 44, this is not limitative, but it may be indicated by turning-on and -off of an LED or LED's, for example.

As described above, according to the present embodiment, states of operation of real-time operating elements are stored in scene memories and the like, instead of storing tone color parameters per se, and data based on the stored operation states are read out for reproduction of musical tone signals. As a result, musical tone signals which were once obtained by operation of the operating elements can be accurately reproduced. Further, when the actual operation state differs from the stored operation state, based on which a musical tone signal is being reproduced, this fact is displaced by the display circuit. This makes it possible to precisely adjust the operation state of the operating element to the operation state being used for reproduction, and hence change the musical tone characteristic based on a musical tone being reproduced.

Although in the embodiment described above, three scene memories are provided for one tone color, alternatively a plurality of scene memories may be provided for each element. For example, in an arrangement in which four elements are provided for each tone color as in the present embodiment, three scene memories may be provided for each element. Then, twelve scene memories in total are provided for one tone color. In this alternative multi-element arrangement, values of a parameter from one element for one tone color may be used (i.e "copied") for another element for another tone color (hereinafter referred to as "the element copying"). On this occasion, data stored in scene memories in the one element or copying element may be copied at the same time.

As described above with reference to the present embodiment, it can be arranged such that a scene memory which is the first to have its stored data read out per each tone color, actually a scene number allotted to the scene memory, is selected in an arbitrary manner. As a result, in such an arrangement, if the element copying is carried out, it can happen that an initial scene number set for a tone color for one element (copying element) from which values of a parameter are to be copied does not coincide with an initial scene number set for a tone color for another element (copied element) into which the values of the parameter are to be copied. For example, if a scene number 1 is set as the initial scene number in the copying element, and a scene number 2 as the initial scene number in the copied element, an initial tone color which is generated based on the scene number 1 in the copying element will be generated based on the scene number 2 in the copied element, so that the initial tone color generated will be different from the original tone color. To avoid this inconvenience, it may be so arranged that change of the scene number may automatically occur at the start of the element copying such that the initial scene number in the copying element is set as an initial scene number in the copied element.

Although in the above described embodiment the tone generator circuit 12 is of the physical model simulation type, alternatively it may be of any other type, such as the FM type and the waveform memory-reading type, which are well known.

Further, a switch which when operated causes resetting of outputs from all the operating elements to "0" may be additionally provided on the switch panel 4. Moreover, an "undo" switch may be additionally provided on the panel switch 4 such that when a scene switch is depressed, a state of operation of the corresponding operating element obtained immediately after the depression of the scene switch is stored, and by depressing the "undo" switch after a change occurs in the state of operation of the above operating element, the stored state of operation is read out.

Also, although the electronic musical instrument according to the above described embodiment has the tone generator circuit 12 incorporated therein, it may be arranged to be connectible to an external tone generator circuit to supply the same with data on states of operation of operating elements.

What is claimed is:

1. An electronic musical instrument comprising:

parameter memory means for storing parameters for determining musical tone characteristics of musical tone signals;

first reading means for reading said parameters from said parameter memory means;

operating means for creating operation information for controlling said musical tone characteristics on a real time basis;

musical tone signal-generating means for generating said musical tone signals, based on said parameters read by said first reading means and said operation information created by said operating means;

operation information memory means for storing said operation information created by said operating means;

second reading means responsive to an instruction from an operator, for reading said operation information from said operation information memory means; and supply means for supplying said operation information read by said second reading means to said musical tone signal-generating means.

2. An electronic musical instrument as claimed in claim 1, wherein said operation information memory means stores a plurality of sets of operation information, said electronic musical instrument including interpolation means for interpolating and outputting said plurality of sets of operation information.

3. An electronic musical instrument comprising:

operating means for creating operation information for controlling musical tone characteristics of musical tone signals on real time basis;

operation information-generating means for generating operation information for controlling said musical tone characteristics of said musical tone signals, independently of said operating means;

operation information memory means for storing said operation information created by said operating means;

musical tone signal-generating means for generating said musical tone signals, based on said operation information stored in said operation information memory means;

indication means for indicating whether said operation information created by said operating means is valid or invalid;

control means for causing said indication means to indicate invalidity of said operation information created by said operating means if said operation information generated by said operation information-generating means does not coincide with said operation information created by said operating means when said operation information is generated by said operation information-generating means, and for causing said indication means to indicate validity of said operation information created by said operating means if said operation information stored in said operation information memory means does not coincide with said operation information created by said operating means when said operation information is created by said operating means;

writing means for writing said operation information generated by said operation information-generating means into said operation information memory means upon generation thereof, and for writing said operation information created by said operating means into said operation information memory means if said indication means indicates validity thereof when said operation information is created by said operating means; and display means responsive to an indication from said indication means, for displaying whether said operation information created by said operating means is valid or invalid.

4. An electronic musical instrument as claimed in claim 1 or 3, including a plurality of operating means constituting said operating means, first memory means storing a predetermined state of assignment of said plurality of operating means to a plurality of tone color parameters, and second memory means for storing a table for changing said predetermined state of assignment.

5. An electronic musical instrument as claimed in claim 3, wherein said operation information memory means stores a plurality of sets of operation information, said electronic musical instrument including interpolation means for interpolating and outputting said plurality of sets of operation information.

6. An electronic musical instrument as claimed in claim 5, including second display means responsive to an output from said interpolation means, for displaying a state of operation of each of said plurality of operating means.

* * * * *